(12) United States Patent
Lui et al.

(10) Patent No.: US 7,515,751 B2
(45) Date of Patent: *Apr. 7, 2009

(54) METHOD AND SYSTEM FOR SEARCHING FOR WORDS AND PHRASES IN ACTIVE AND STORED INK WORD DOCUMENTS

(75) Inventors: Charlton E. Lui, Redmond, WA (US); Gregory H. Manto, Redmond, WA (US); Vikram Madan, Bellevue, WA (US); Ryan E. Cukierman, Redmond, WA (US); Jon E. Clark, Livermore, CA (US)

(73) Assignee: Microsoft Corporation, Redmond, WA (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/530,854

(22) Filed: Sep. 11, 2006

(65) Prior Publication Data

US 2007/0005591 A1 Jan. 4, 2007

Related U.S. Application Data

(60) Division of application No. 10/177,480, filed on Jun. 21, 2002, now Pat. No. 7,155,061, which is a continuation-in-part of application No. 09/643,617, filed on Aug. 22, 2000, now Pat. No. 6,785,417.

(51) Int. Cl.
*G06K 9/18* (2006.01)
(52) U.S. Cl. .................. 382/186; 382/187; 382/218; 382/229; 707/3; 707/E17.069

(58) Field of Classification Search .............. 382/186, 382/187, 218, 228, 229; 707/3, 5, 6, 500, 707/E17.039, E17.069
See application file for complete search history.

(56) References Cited

U.S. PATENT DOCUMENTS

| 5,675,665 | A  | * | 10/1997 | Lyon .................... 382/229 |
| 6,565,611 | B1 | * | 5/2003  | Wilcox et al. ............ 715/203 |
| 6,785,417 | B1 | * | 8/2004  | Williamson et al. ....... 382/186 |
| 7,155,061 | B2 | * | 12/2006 | Lui et al. ................ 382/186 |
| 7,336,827 | B2 | * | 2/2008  | Geiger et al. ............ 382/186 |
| 2002/0165873 | A1 | * | 11/2002 | Kwok et al. ............ 707/500 |
| 2005/0055628 | A1 | * | 3/2005  | Chen et al. ............ 715/512 |
| 2005/0154707 | A1 | * | 7/2005  | Napper et al. ............ 707/3 |
| 2006/0277159 | A1 | * | 12/2006 | Napper et al. ............ 707/3 |
| 2007/0005591 | A1 | * | 1/2007  | Lui et al. ............... 707/5 |

* cited by examiner

*Primary Examiner*—Gregory M Desire
(74) *Attorney, Agent, or Firm*—Workman Nydegger

(57) ABSTRACT

In a computing device, a method and system for searching for matching ink words or phrases, by comparing a given search term of at least one word (and possibly alternates) with the words in a document, including recognized ink words and any possible alternates for those recognized words as returned by a recognizer. Various matching tests are possible because of the use of alternates, which also may have corresponding probability rankings that may influence the search. Searching may occur in actively edited ink documents, or the recognition results may be saved as saved search file data that can be searched independent of recognition.

20 Claims, 11 Drawing Sheets

METHOD AND SYSTEM FOR SEARCHING FOR WORDS AND PHRASES IN ACTIVE AND STORED INK WORD DOCUMENTS

CROSS-REFERENCE TO RELATED APPLICATION

This application is a divisional of U.S. patent application Ser. No. 10/177,480, filed Jun. 21, 2002, and entitled "METHOD AND SYSTEM FOR SEARCHING FOR WORDS AND PHRASES IN ACTIVE AND STORED INK WORD DOCUMENTS", which is a continuation-in-part of U.S. patent application Ser. No. 09/643,617, filed Aug. 22, 2000, now U.S. Pat. No. 6,785,417, both of which are incorporated herein by reference. This application claims the benefit and priority of both the foregoing applications.

FIELD OF THE INVENTION

The present invention relates generally to methods and systems on computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen, digitizer, tablet PC and/or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

When dealing with typewritten input entered into a word processing program, it is relatively straightforward to implement a "find" or "search" feature as part of the program. With text, a user types in a search string and possibly enters some properties of the string, (e.g., bold typeface), and the program searches for a string in a document that exactly matches the word and any specified properties. Such a search is straightforward because typewritten input entered into a word processing program is defined by a limited set of codes, e.g., ASCII numeric values represent alphanumeric characters, and there is a limited set of properties a string can have. In general, the word processing program simply advances through the document attempting to match the full set of entered codes of the search string with a string of codes in a document in order to find an exact (allowing for any wildcards) match.

However, when entering handwritten ink, e.g., via an electronic ink processing program, it is virtually impossible for a user to write a word exactly the same way twice. Thus, searching is not possible via the simple "exact-string-match-or-not" operation. One attempted search method featurizes the electronic ink (e.g., handwritten data in the form of coordinates and other information) entered by a user, and searches through the document to find another piece of ink with similar features. This method is not very reliable, as for example, the same user can write two sets of ink, each of which is intended to be the same word, but that significantly vary from each other's features from the computer's perspective. A second method uses simple string comparison, using the translated text word that appears for any handwritten input. This second method is also relatively unreliable, because such a search depends on a recognizer making a correct translation for each translated word, despite the reality that recognizers are not one hundred percent accurate. Such inaccuracy is amplified when phrases of more than one word are searched, because known string comparison mechanisms typically translate phrases into text that is then treated as a single search unit when compared against the text of the phrase being searched, and the greater the number of words in the phrase, the greater the likelihood of a recognition error.

One other problem with conventional ink searching is that significant resources are needed and consumed to recognize the words or phrases that are being compared. Thus, if a user wants to find an ink document with a recognized search term in it, a recognizer needs to be present on the system to recognize the document (at least until a match is found) in order to determine whether the search term matches at least one ink word (or phrase) in that document. Performing such recognition is often not desirable, such as when searching for a stored document among relatively many documents.

SUMMARY OF THE INVENTION

One solution would be to use a larger display device. However, this is impractical for most users because of the cost this would entail. In addition, the diagrams may become so large that no practical display device could display all of the elements of the diagram.

Briefly, the present invention provides a system and method for searching (finding matches) for recognized handwritten words or phrases in an ink document that is actively open for editing, or in saved search data corresponding to a saved ink document. To search a phrase of more than one word, the search term (the phrase) is parsed into separate words, each of which is then individually matched against corresponding words in a target stream in the document. The comparison may include comparing the search term with recognized words and any possible alternates for those recognized words, as returned by a recognizer. The search may progress through the ink document by advancing the starting position of the target stream to be compared as needed.

For handwritten (ink) words, one implementation may look for an exact match between an entered search word (and possibly alternates of the search word) and the recognized words and their alternates stored in a handwritten document. To this end, the recognized word and each alternate associated therewith are examined against an entered search word and possibly its alternates. Each time a word matches, the algorithm advances to the next word in the search stream and in the target stream. The search is considered as finding a successful match when all words in the search term are matched to corresponding terms in the target stream, although it is possible to require less than a match of all terms (e.g., a threshold matching percentage, which may be user configurable) to be sufficient to constitute a successful match.

Numerous variations are possible when searching because of the use of the recognized alternates, which also may be returned with a probability ranking. For example, when matching the individual words, rather than requiring a strict exact match test on the alternates, a scheme that looks for a percentage of matching characters can be implemented, with the user optionally adjusting the percentage, e.g., from loose to exact. Other variations include the weighting of certain characters, (e.g., the first character has to exactly match, with only a percentage of others needed), and/or factoring in the number of syllables. Since alternates are returned with a probability, the probabilities of alternates may be used, e.g., a looser match is adequate on a highly probable word, while an exact match is required on a less probable word. Other variations include length of word weighting, Bayesian combination of probabilities to determine weighting, alternate to alternate exact match, percentage of, alternate to alternate matches, the percentage of the percentages and so on, and the use of word/alternate matching in conjunction with ink/feature/bitmap/image matching. Various combinations of these variations are also feasible.

The word or phrase matching may be accomplished in ink documents that are being actively edited as well as ink documents that are saved. To accomplish word and phrase searching in saved ink word documents, the necessary handwriting recognition data is extracted from the ink recognition components at save time, and this data is saved in association with the ink data as associated search file data. As a result, a search mechanism has the results of the handwriting recognition available to perform the searching, without having to invoke handwriting recognition every time the target data to search is needed.

Other advantages will become apparent from the following detailed description when taken in conjunction with the drawings, in which:

DETAILED DESCRIPTION

Exemplary Operating Environment

Figure 1:
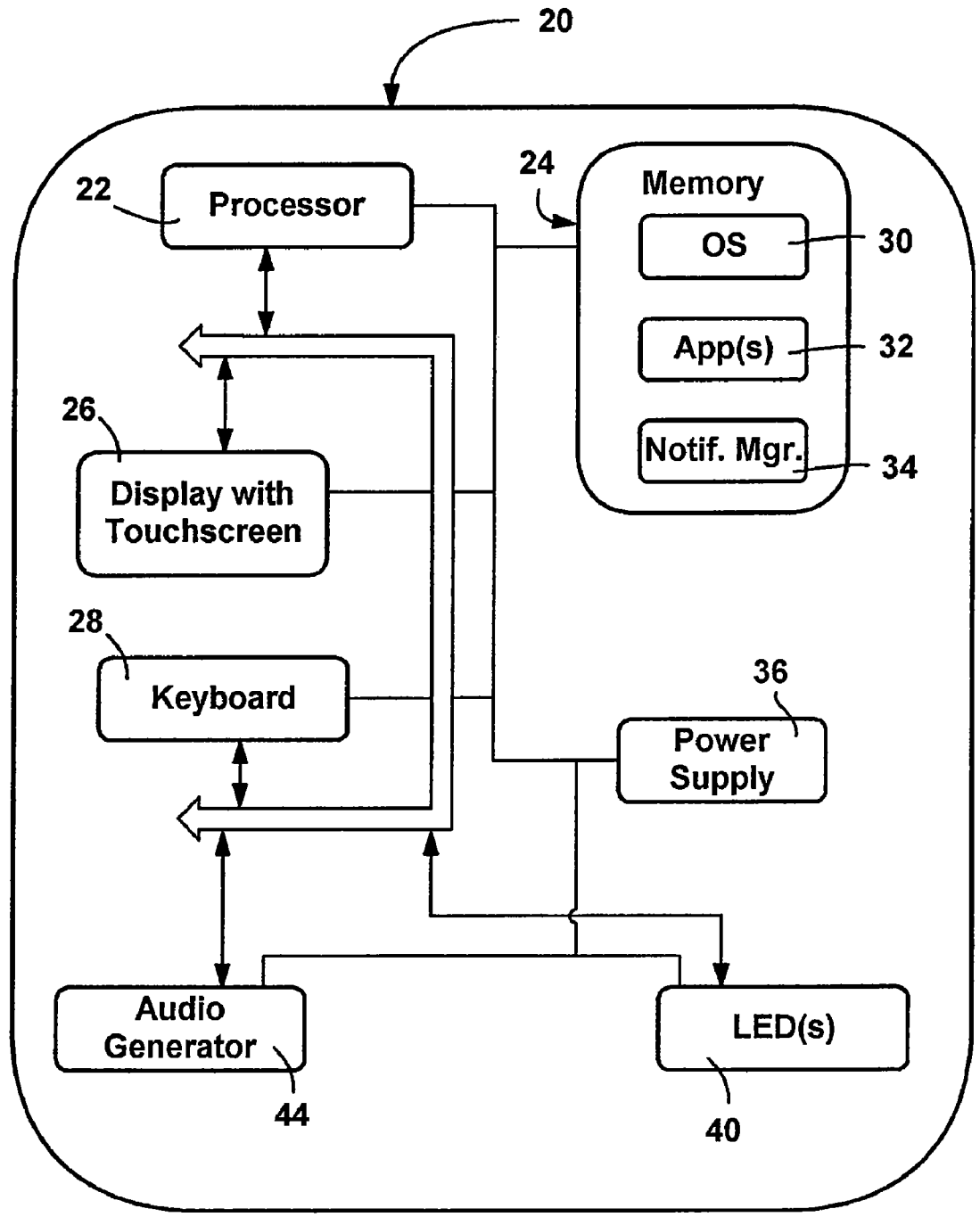
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, tablet personal computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 20 typically includes at least some form of computer readable media. Computer-readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system. For example, on a Tablet PC or other computer, the operating system may comprise the Windows® XP operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40 and an audio generator 44. These devices may be directly coupled to the power supply 36 so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Ink Word and Phrase Searching

Figure 2:
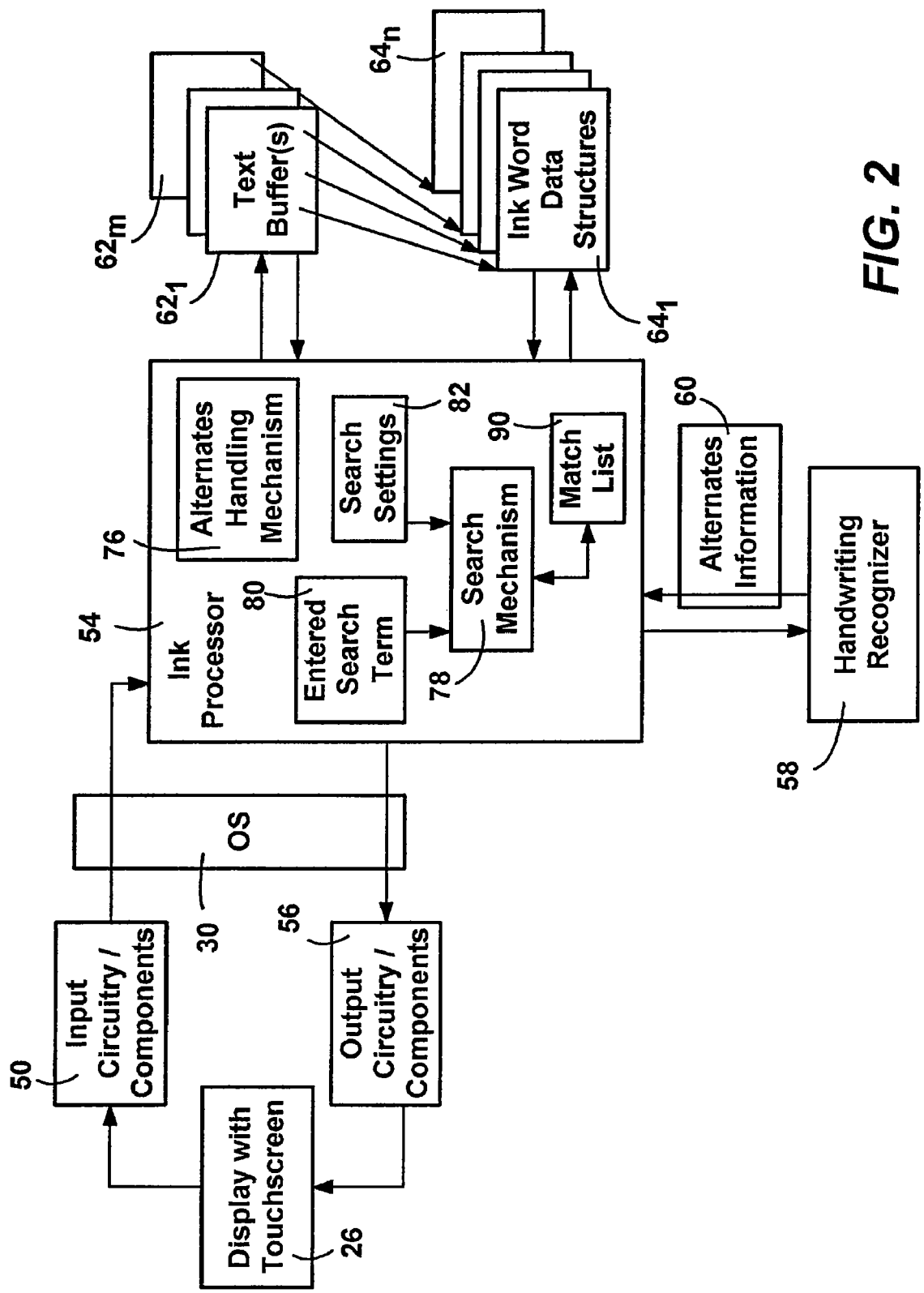
FIG. 2 is a block diagram generally representing components and data structures for handling electronic ink handwritten into a computer system and capable of implementing the present invention.

FIG. 2 represents general components and data structures of the computing system 20 when configured for active handwriting recognition and ink word and phrase searching in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer or via a built-in digitizer, e.g., on a Tablet PC.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

After some pre-processing, such as described in U.S. patent application Ser. No. 09/643,417 entitled "Method and System of Matching Ink Processor and Recognizer Word Breaks," the ink processor 54 passes ink data (e.g., one line as entered by a user) corresponding to words or symbols to a recognizer 58 for recognition thereof. The ink processor 54 may also provide ink feature information. Depending on factors such as the system's processing speed and processor/memory availability and so forth, and/or a user's explicit request for recognition, the data passing and/or recognition may take place in the background or foreground, as appropriate.

In keeping with the present invention as described below, the recognizer 58 returns alternates information 60 corresponding to recognized word or words for the ink passed thereto. In general, the alternates information 60 comprises a list of alternate word choices, or simply alternates (sometimes referred to as candidates), for each word recognized by the recognizer 58 for a given set of handwriting data passed thereto. The alternates may be ranked and/or grouped/classified in accordance with probability of correctness, and/or probability information associated with each alternate may be returned in the alternates information 60. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list. Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer that returns alternates, including a speech recognizer.

As generally represented in FIG. 2, the ink processor 54 maintains one or more text buffers $62_1$-$62_m$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$-$64_n$ relative to text and other items in the text buffer $62_1$. Each such code is directly followed by a pointer (shown in FIG. 2 via the slanted lines from the text buffers) to the ink word data structure (sometimes referred to as a scrawl) that contains the ink data for that word.

Figure 3:
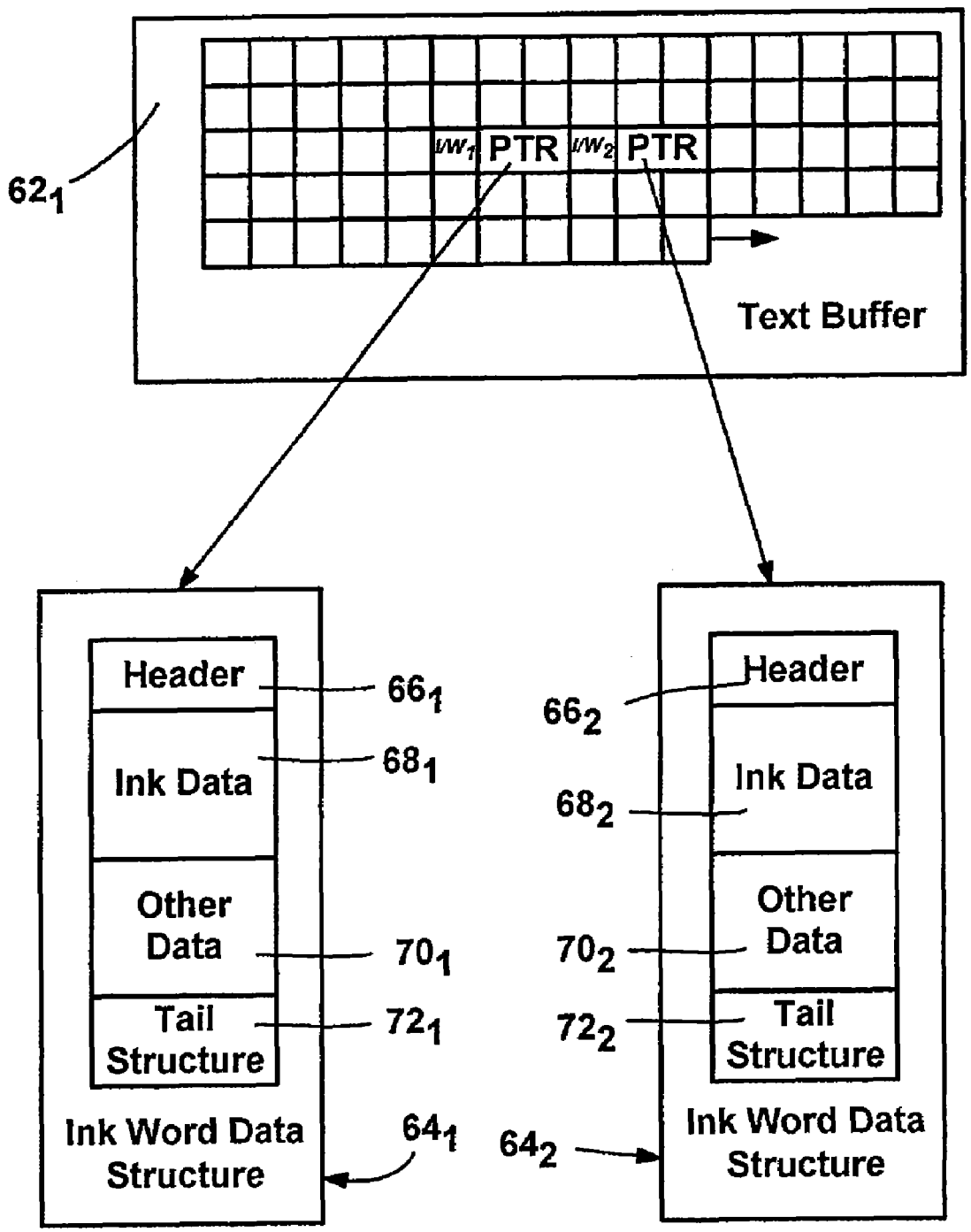
FIG. 3 is a representation of how handwritten data and text data is generally maintained by the ink processor.
Figure 4:
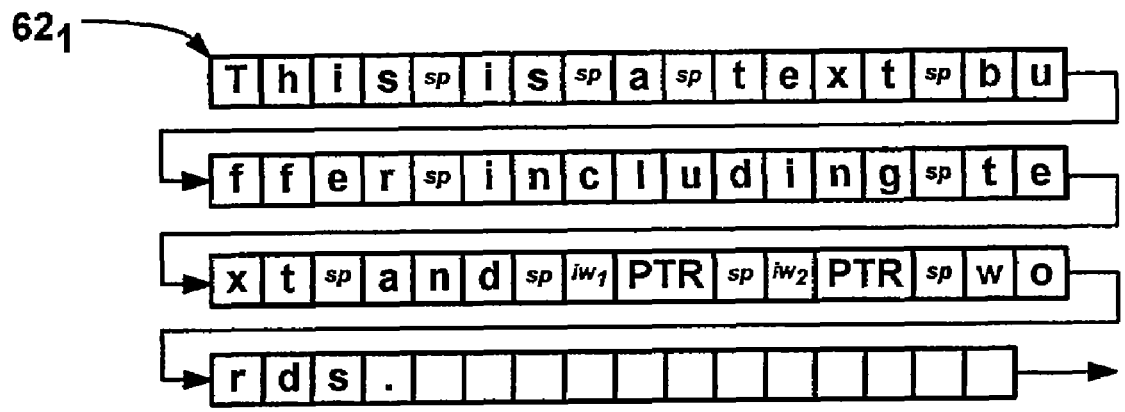
FIG. 4 is a representation of the contents of an example text buffer and how it is displayed to a user.
Figure 4:
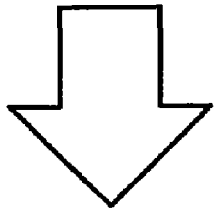
Figure 4:
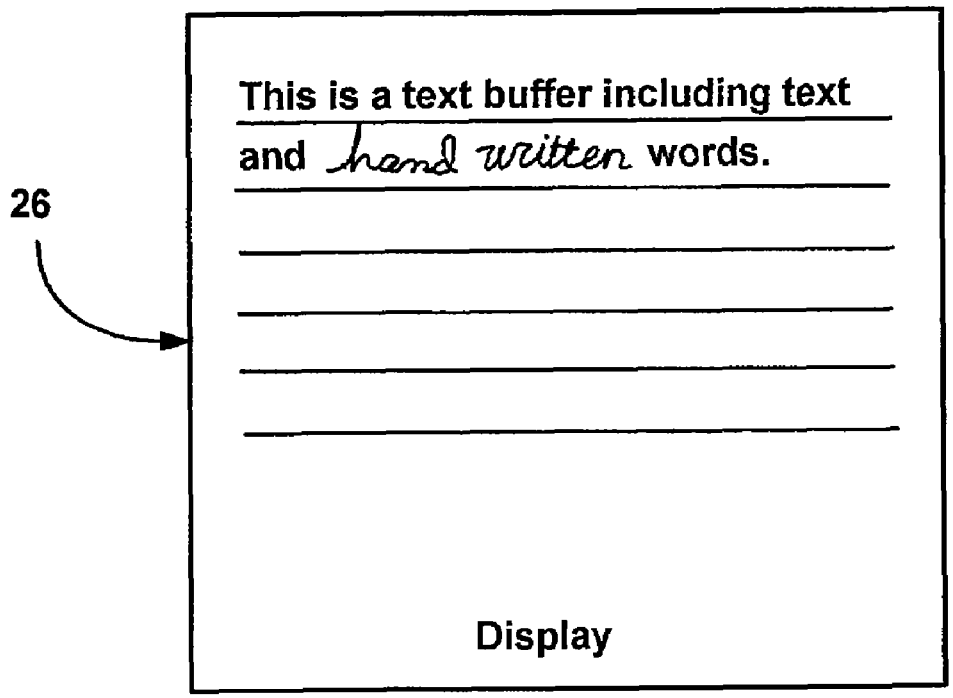

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$-$64_2$. As shown in FIG. 3, the pointers are two bytes in length, but of course pointers of other sizes are feasible. Also, only two ink words are shown, and are consecutive in the text buffer, however any number of ink words may be placed anywhere in a document/text buffer. FIG. 4 shows how the text buffer $62_1$ (shown in FIG. 4 as a linear array) and its ink word data structures $64_1$-$64_2$ may be interpreted by the ink processor to result in a particular display, having been converted to their text form.

As generally represented in FIG. 3, each ink word, such as the ink word $64_1$, comprises a data structure having a header 66 which describes the ink data section 68 following it. One of the things tracked in the header 66 is whether an ink word has alternates (i.e., the ink was sent to the recognizer with the alternates information returned therefor). For example, this may be tracked in a Recognized (tsRecognized) flag.

In addition to the header field 66 and ink data field 68, other fields are possible, such as an other data field 70 followed by a tail structure field 72 that describes the other field 70. For example, the other field may include the alternates and probability information associated with those alternates as returned by the recognizer 58 following recognition. As described below, the tail structure field 72 describes this other field 70. The maintenance and use of the alternates, and the tail structure, are described below and further described in these U.S. patent applications: Ser. No. 09/644,002 entitled "Method and System for Handling the Selection of Alternates for Recognized Words," Ser. No. 09/643,414 entitled "Method and System for Maintaining Alternates in Association with Recognized Words" and Ser. No. 09/643,997 entitled "Method and System for Extending Ink Word Data Structures while Maintaining Version Compatibility."

The following table sets forth an ink word data structure (scrawl) including the tail structure, (also described below with reference to FIG. 6):

```
// The Ink Word Structure
typedef struct TXT_SCRAWL
{
    U8            flags;
    U8            candidateChoice;    //index of chosen candidate
                                      //zero based
    INK_STYLE     inkStyle;
    COORD16       width;
    U16           strokeCount;
    U16           bufferSize;
    U8            buffer[2]; //padded for alignment
    // first comes the array of strokes
    //then comes a double null terminated list of strings
    //at the very end is a TXT_SCRAWL_TAIL struct
} TXT_SCRAWL, FAR * P_TEXT_SCRAWL;
// this buffer is appended onto the scrawl to optimize
// getting to strings. For compatibility reasons, it
grows // from the beginning, not the end of the tail
structure,
// since a negative addressing scheme from the text scrawl
// end is used to get to its members
typedef struct TXT_SCRAWL_TAIL
{
    U32           tailStructVersion;   //starts at 1 and grows
                                       //upwards;
    U32           stringAreaOffset;    //offset from beginning
                                       //of TXT_SCRAWL to the
                                       //start of the double
                                       //null terminated
                                       string
                                       //list.
    U32           chosenStringOffset;  //offset from beginning
                                       //of TXT_SCRAWL to the
                                       //chosen string.
    U16           wchFirstXlateChar;   //first char of the
                                       //chosen string.
// ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

One of the operations performed by the ink word processor 54 is to manage the alternates returned by the recognizer 58. To this end, as generally represented in FIG. 2, the ink processor 54 includes code that serves as an alternates handling mechanism 76. In one preferred embodiment, following recognition of a word, the alternates handling mechanism 76 maintains the alternates data in an ink word data structure (e.g., 64₁) of the text buffer e.g., 62₁, such as in the other field 70₁ as described by the tail structure field 72₁. Once a word has been converted to text or had an alternate selected for it, the ink word data structure is displayed as the first letter of the selected alternate, with any remaining letters being inserted as text into the text buffer.

Figure 5:
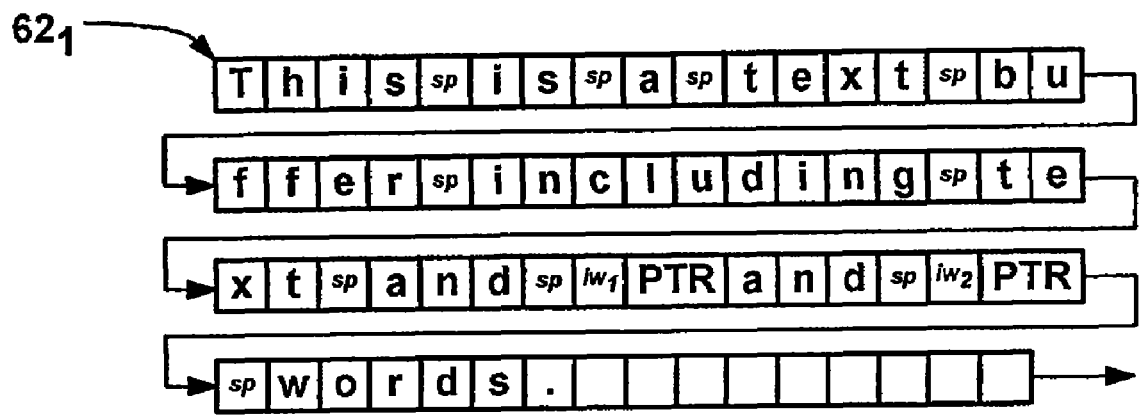
FIG. 5 is a representation of the contents of the example text buffer of FIG. 4 as modified once alternates have been returned for an ink word.
Figure 5:
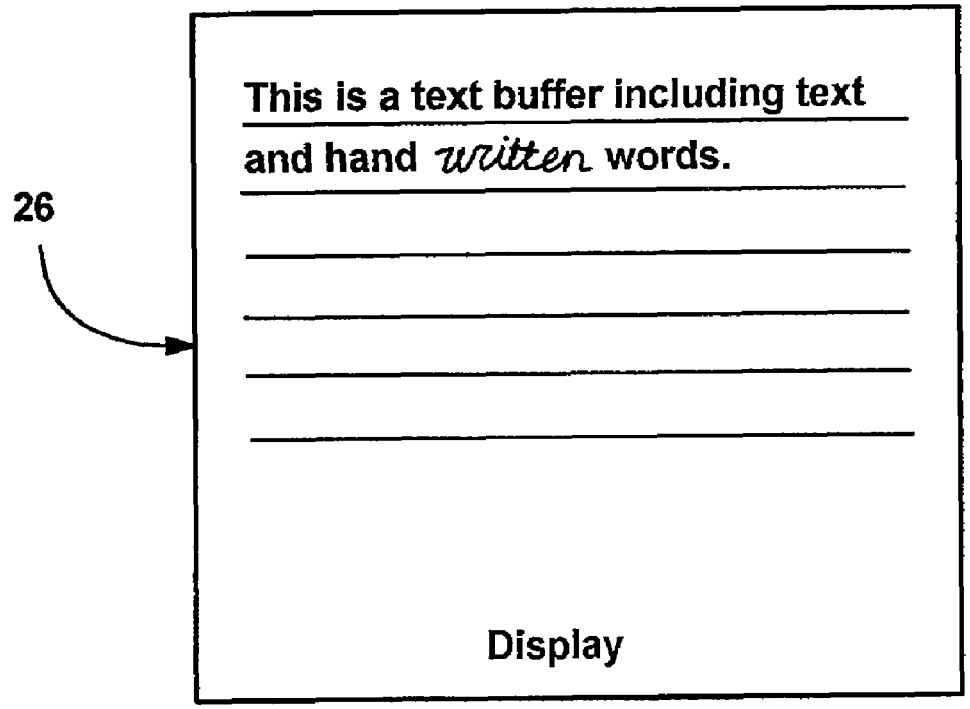
Figure 6:
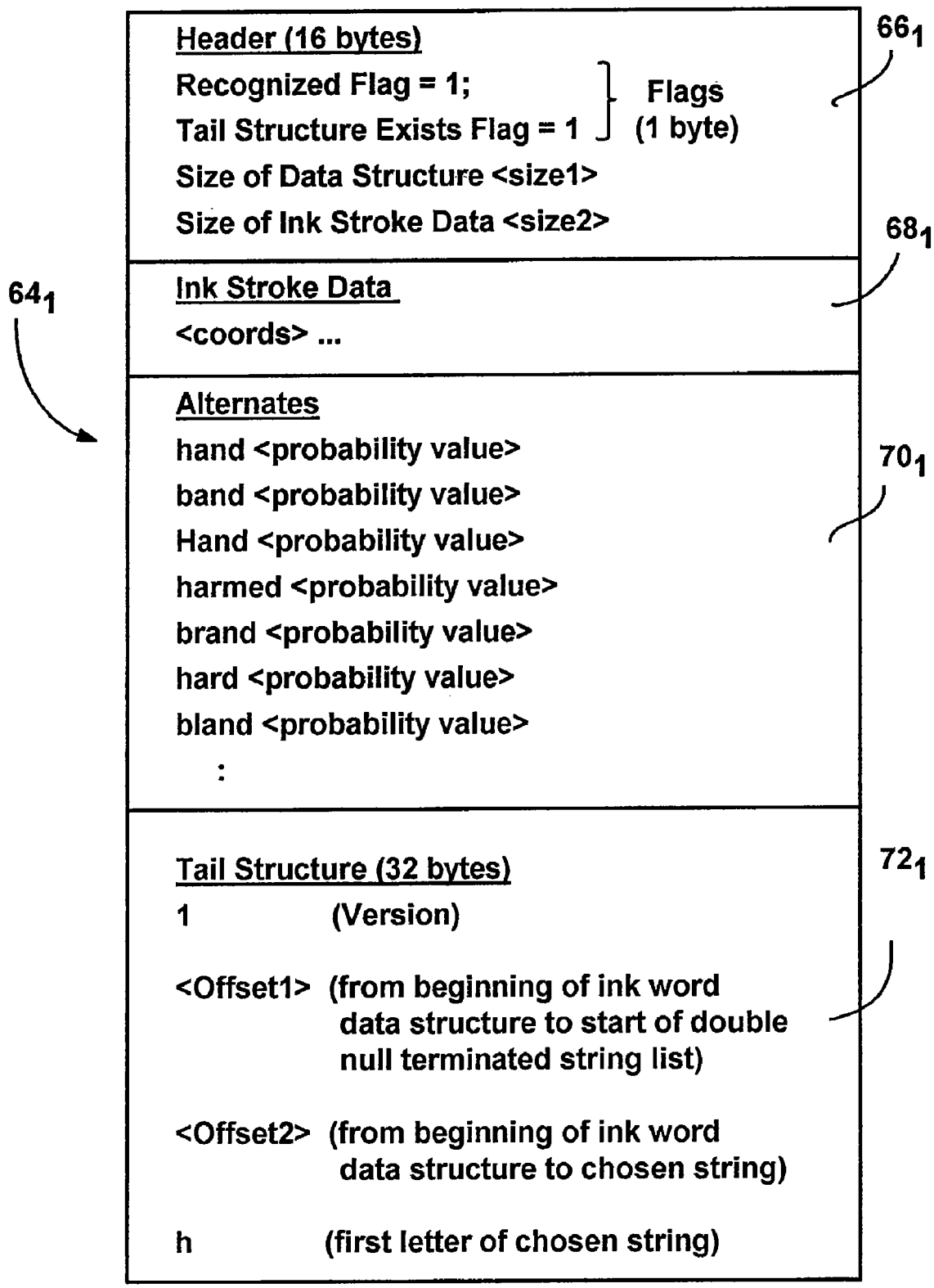
FIG. 6 is a representation of an ink word data structure once the alternates have been returned by a recognizer for an ink word, including a tail structure.

FIGS. 4 and 5 shows how this is accomplished by manipulating the text buffer 62₁, while FIG. 6 shows how the information is added to the ink word data structure 64₁. As shown in FIG. 4, prior to recognition by the recognizer 58, the ink word is treated as one unitary word (e.g., the handwritten word "hand") for purposes of ink processing. In other words, the user moves the word around as a unit, deletes it as a unit, and cannot insert text in between the letters (although it is feasible to allow such an ink word to be split by the user, such as by converting the single ink word data structure into two ink word data structures each having part of the stroke data of the original ink word data structure therein). However, once the word has been recognized and an alternate has been selected for it, (e.g., the system automatically selects the most probable alternate in response to a user actively requesting recognition such as via a "Tools:Recognize command), the text buffer 62₁ and data structure 64₁ are changed as shown in FIGS. 5 and 6, respectively.

In FIG. 5, the text "hand" has been selected as the alternate for the handwritten data ("hand" as written out in FIG. 4). As represented in FIG. 5, upon user selection of "hand" as the selected text word, the letters following the first letter, "and" are inserted into the text buffer 62₁. The ink word (IW1) remains the same from the perspective of most of the code that deals with the text buffers, for example, the editing code. However, the alternates handling mechanism 76 changes the ink word data structure 64₁, whereby the ink processor 54 displays the ink word data structure 64₁ differently so as to produce the correct output for display purposes, i.e., only as a first, single text letter of the word. This enables the editing code to edit the individual characters of the word in the text buffer, without having to modify the code base to enable editing within the ink word data structure. At the same time, the stroke data and alternates information is preserved with what is serving as the first letter of the selected word.

To correctly interpret the ink word data structure, as represented in FIG. 6, the alternates handling mechanism 76 works with flags in the header 66₁ of the ink word data structure 64₁, the aforementioned Recognized flag which indicates whether the word has had alternates returned therefor, and a Show Recognized flag (tsShowRecognized) which indicates whether the user has converted the ink to text. Note that the Show Recognized flag is set when the user has converted to text, e.g., via a Recognize command, as generally described in the aforementioned U.S. patent application entitled: "Method and System of Handling the Selection of Alternates for Recognized Words." A Tail Structure Exists (tsTailStructureExists) flag indicates whether the tail structure is present in an ink word data structure. Note that for now, the Tail Structure Exists flag has the same value as the Recognized flag. However, the Tail Structure Exists flag is provided for the future, wherein other information may be stored in the ink word (as described in the tail structure), and it is possible to have a tail structure with no alternates.

The ink processor 54 uses these flags to determine whether it needs to contact the recognizer 58 to obtain alternate information, and also to determine whether to display the ink word as ink or as a text letter. When the word has been recognized by the recognizer, i.e., has had the alternates information 60 returned for it, the alternates and the tail structure are essentially appended to the ink word data structure 64₁ (actually copied to a copy thereof). If the word is to be displayed as text, (e.g., the ink has been converted to text and the Show Recognized flag equals one), only the first character ("h" in the present example, stored in the tail structure $72_1$) of the word is displayed. As represented in FIG. 5, the succeeding letters of the word ("and" in the present example using the word "hand") are inserted into the text buffer as ordinary text immediately following the ink word.

The tail structure describes the alternate information added to the ink word data structure $64_1$, and also factors in its own data in the total size description. In general, the tail structure comprises a version code (one in the present example), two offsets, and the first letter of the chosen string. The two offsets are zero-based and indicate where in the data structure the alternate information (double null terminated string list) begins, and where in the data structure the chosen string information begins. As can be readily appreciated, it is straightforward to determine where the alternates information begins from these offsets, and because the tail structure size is known (thirty-two bytes in version one) as long as the version number can be located, which can be accomplished by leaving the version number a certain number of bytes from the end. Note that when the alternates/tail structure is copied to a new ink word data structure, the size of the data structure in the header is modified to include this data. The computing of the tail structure and the copying of the information are generally described in the aforementioned U.S. patent application entitled "Method and System for Extending Ink Word Data Structures while Maintaining Version Compatibility."

Note that instead of directly including the alternate information/tail structure in (a copy of) the ink word data structure, the information can be indirectly included, e.g., by storing a pointer to another data structure that includes the alternates information/tail structure. The length of the ink word data structure can be increased, (e.g., by the size in bytes of the pointer), and when the tail structure exists flag is set, the ink processor 54 knows that the pointer is at the end of the ink word data structure. Such a pointer will move with the ink word.

As can be readily understood, it is straightforward to maintain the probability information with the alternates, which are null delimited. For example, each string can have exactly n bytes before or after it after it (but before the zero delimiter) that store the probability data for that string, such as generally represented in FIG. 6. Also, another delimiter could be used to separate probability data from the string data, e.g., the string followed by a null followed by the data followed by a null makes up one string choice, probability data pair. Alternatively, the tail structure could be expanded to separately describe a probability field.

Thus, in the example shown in FIGS. 4-6, once recognized and converted to text, the ink word storing the data for "hand" will be converted to an ink word that when displayed will appear as the letter "h" followed by the text letters "and" in the text buffer. In this manner, the ink data and alternates are preserved with the word, e.g., as the word is moved around during word processing operations. Also, the user can individually edit the characters in the word.

In accordance with one aspect of the present invention, the alternates information, possibly including the probability information, (and possibly other alternate-related data such as number of syllables, number of characters (length) of the alternates and so forth), is used to determine whether an ink word sufficiently matches an entered search word to be considered a match. Ink word matching can be extended to phrases, as described below, wherein a phrase may comprise more than one word.

To determine whether an ink word sufficiently matches an entered search word or phrase, as generally represented in FIG. 2, the ink processor 54 includes code that serves as a search mechanism 78, which takes an entered search term (word or phrase) 80 and based on search settings 82, evaluates it against the information in the text buffers 62 and ink word data structures 64 to look for matches. Note that as used herein, a search "term" comprises one or more words, and "term" should not be interpreted herein as being singular; as described below, multiple words in a search term are parsed and individually compared against words in a document, and not treated as a whole, (at least not typically, although an option to treat a phrase as a single unit may be provided to the user). As will be understood below, the word match need not be exact, but rather can be "fuzzy," in that it may be based on various information present within or derived from the alternates information. Similarly, the phrase match need not be exact, but also can be "fuzzy," such as if most but not all words in the phrase match, e.g., to some criterion such as percentage that a user may configure.

For simplicity herein, each ink words in the document for which the search mechanism 78 is searching can be considered as recognized, i.e., they have alternates returned therefor, as either the ink words have already been recognized (whether in foreground or background recognition) or are sent to the recognizer when encountered during a search. Note however that the search can also encounter regular (e.g., typed-in or permanently converted) text during a search, and the present invention can handle searching such regular text. Moreover, as described below, the recognition data for the ink words may be saved in association with the document, whereby the search mechanism can search the document without requiring the performance of any recognition.

The entered search term (word or phrase) 80 can be typed in (e.g., on a physical or virtual keyboard), in which event it is exactly known, or itself can be handwritten (if a recognizer is available), in which event each word in the entered search term 80 may have alternates returned for it, which can also be used in the search operation (and may be considered part of the search term 80). A mixture of typed and handwritten words (each with alternates) is feasible in a search term comprising a phrase. Wildcards and other properties may be specified by the user when entering the search term 80, but are not described herein for purposes of simplicity.

Further, in keeping with the general concept of fuzzy searching, the user may vary the search settings 82, such as to set a level of exactness (e.g., move a slider bar between loose and exact, and/or toggle between one of a set of preset values) and/or to select different types of searches that can be carried out. The optional use of the search settings 82 in performing various types of searches is described below. Note that a number of ways of searching for matching ink words and phrases are described below, and the user may be able to combine several and adjust sensitivity levels to customize how the search is accomplished. Empirical testing can also determine which tests perform more optimally for a variety of users, for example, to set defaults, eliminate or reduce the impact of some possible tests, and so forth. Further note that the tests may vary based on language and writing styles, e.g., one combination of tests may work very well with English-language cursive words, another with printed words, and still another with Far Eastern languages.

Figure 7A:
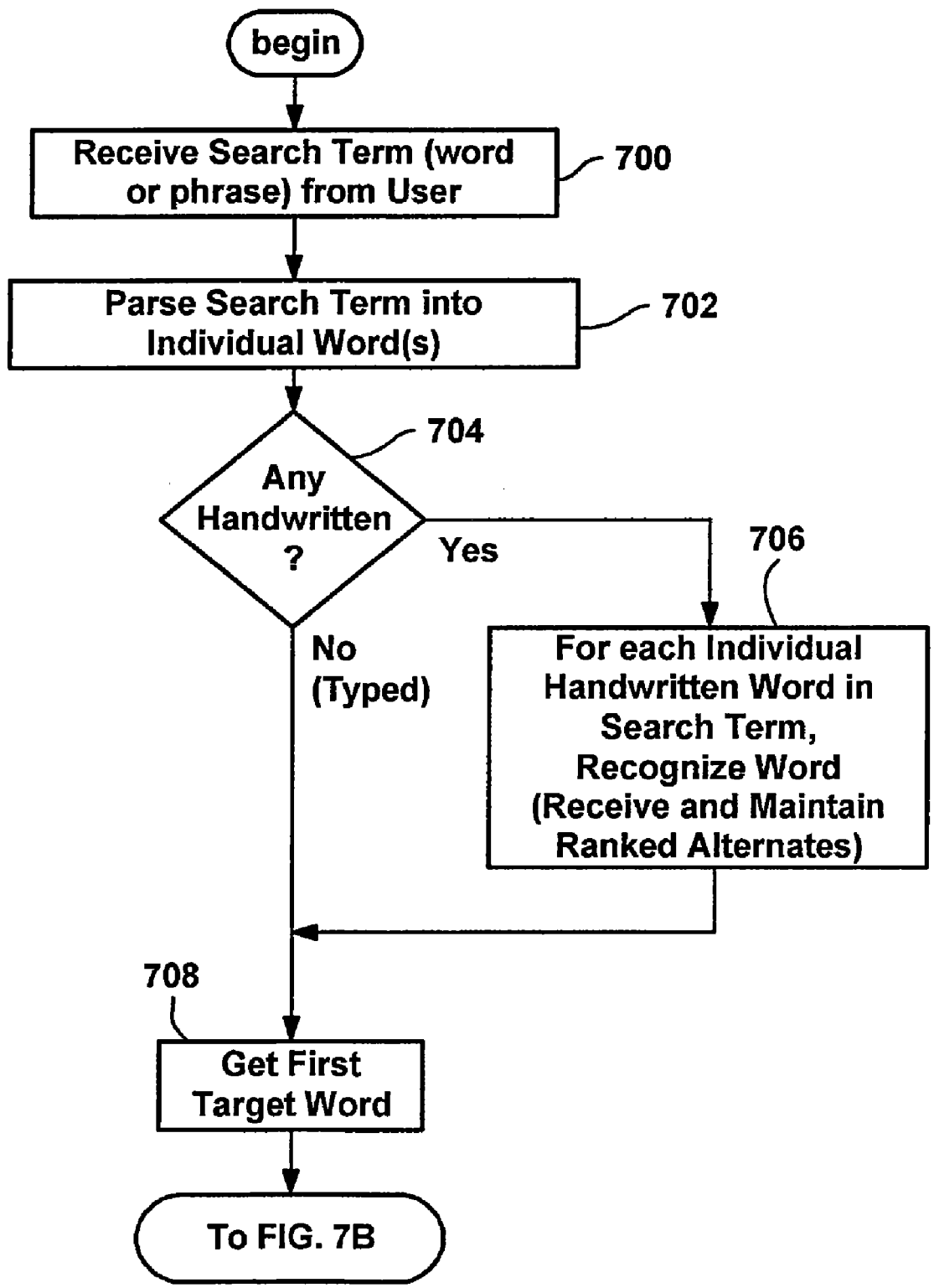
FIGS. 7A and 7B comprise a flow diagram generally describing how a document including ink words is searched for words and phrases, in accordance with one aspect of the present invention.
Figure 7B:
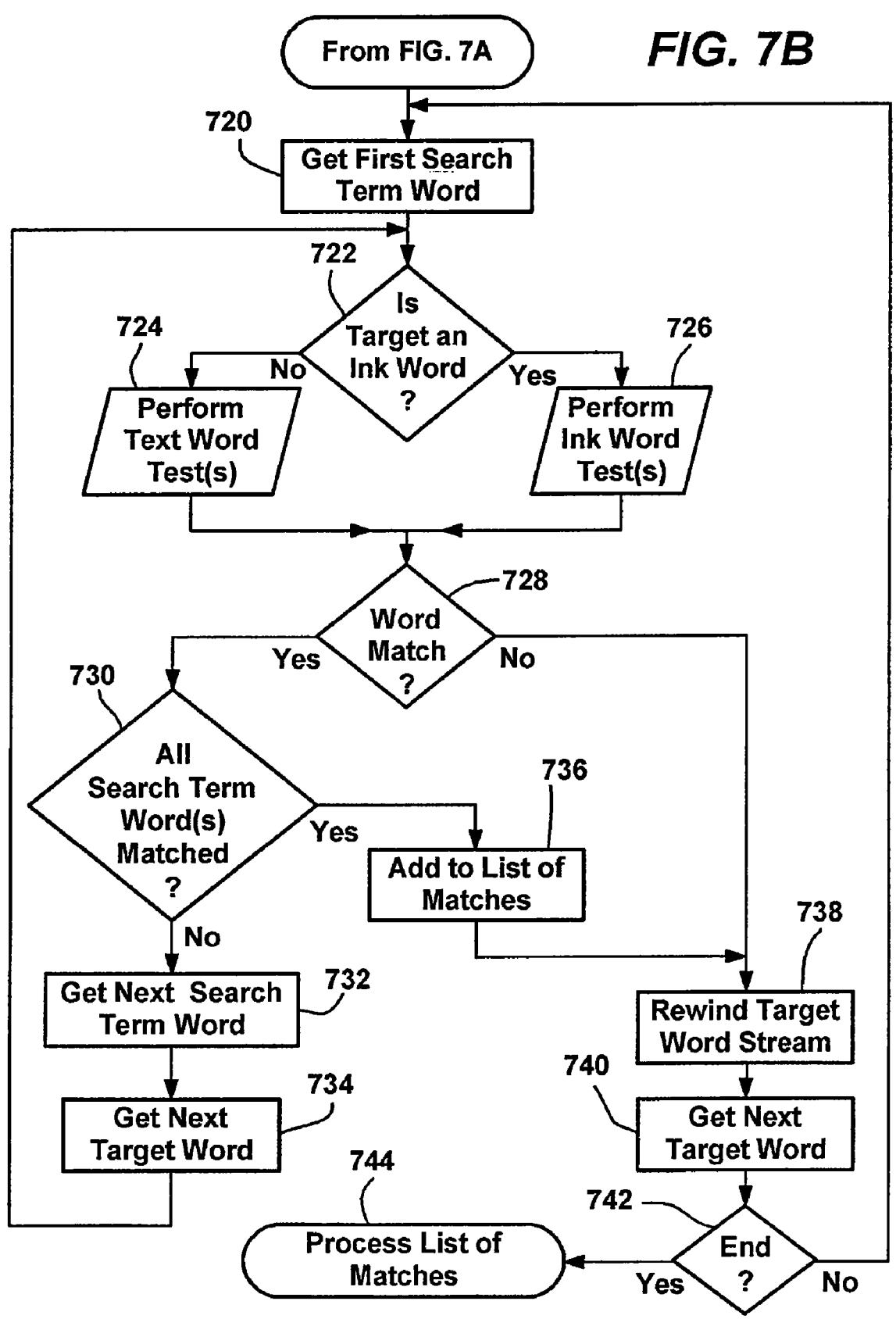
Figure 8:
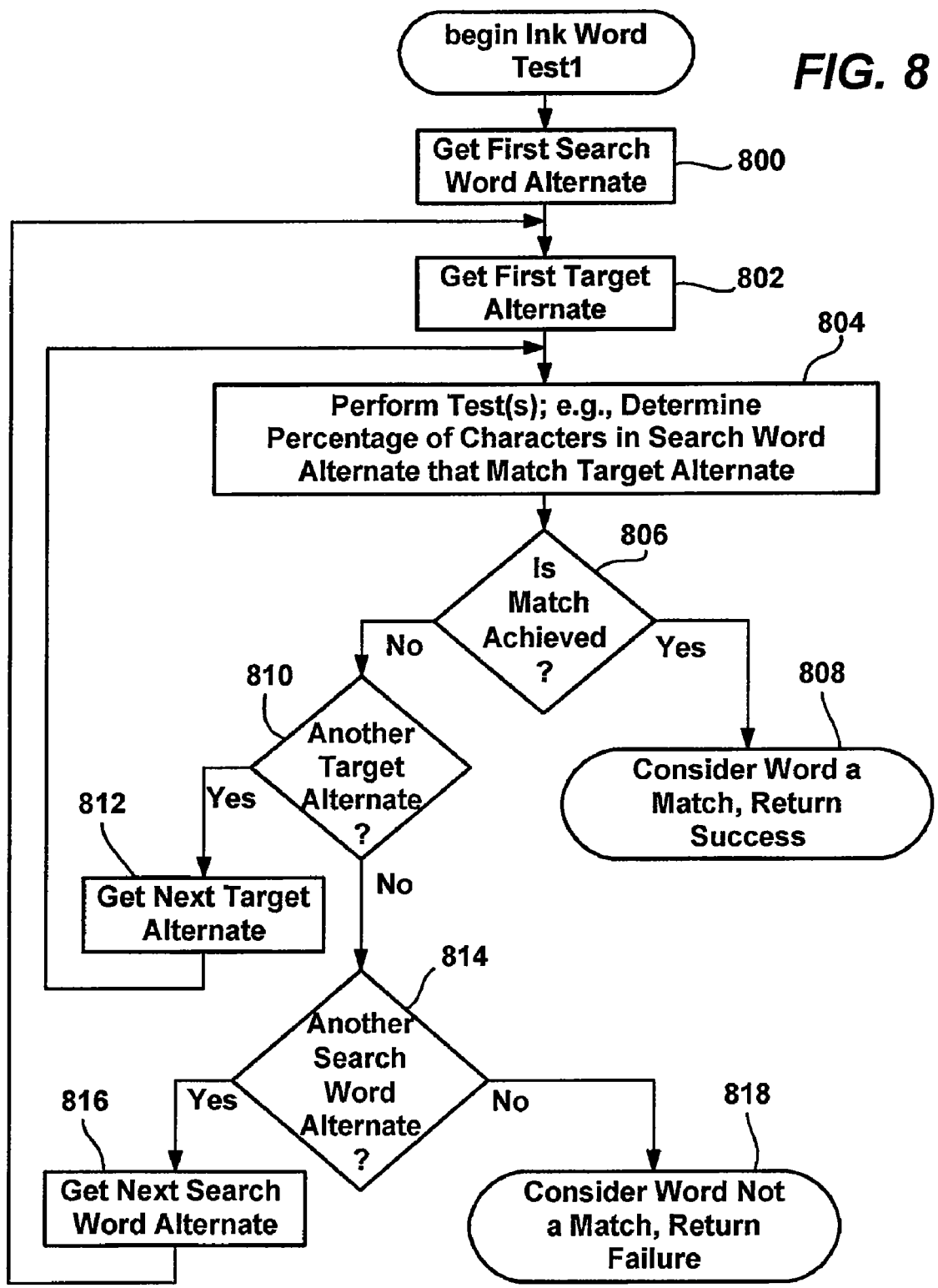
FIG. 8 is a flow diagram generally describing how alternates are used in searching for a match in accordance with one aspect of the present invention.

Turning to a general explanation of the operation of the present invention, FIGS. 7A, 7B and 8 describe how the search mechanism 78 of the ink processor 54 searches for matches of words and phrases using one exemplary type of test, shown in FIG. 8 as a test based on a percentage of matching characters for each word of a search term, which is individually compared against a word in the document. In FIGS. 7A and 8, each word in the search term can be input as exact text (e.g., typed in), or can be input as handwritten text, whereby the search term is recognized and may have alternates information returned for it. A search term comprising a phrase can have a mixture of typed text and handwritten input. As will be understood, in some of the tests, if the search term has handwritten input such that alternates are available, the search term's alternates information may be used in determining whether each word (or set of alphanumeric characters or the like that does not necessarily comprise a word) in a document matches, i.e., is considered a match according to various criteria. Also, for purposes of simplicity, each word in the search term may be considered as a "search term unit" or "search term alternate" or the like even though there may be only one such alternate word, (e.g., no alternates exist for a typed-in term).

In addition, each word or set of characters that each search term word (or alternate) is being compared against will be referred to as the "target word," "target word unit" or "target alternate," even though there may not be any alternates for a given word and the target word unit or alternate being evaluated may not actually be a full "word" as understood in conventional usage, but rather some symbol and/or combination of alphanumeric or other characters that may or may not be part of an actual word. The target word may comprise the entire text buffer or buffers to the end of the document, such that multiple-word phrases including spaces between words, paragraph marks, tabs and so forth can also be searched, and a search "string" or "stream" can contain a combination of both text and handwritten input. However for purposes of simplifying the description herein, each individual search term can only be either text or a handwritten word.

In accordance with one aspect of present invention, the ink word search algorithm takes into account the possibility that each word in the sequence may or may not have been misrecognized independent of the other words. Rather than treating the phrase as a whole, the phrase is separated into individual search term words, and each word in the search term needs to be individually matched with a corresponding ink word document (target) word. Additional heuristics may be applied to optimize the process and/or help ensure that the search finds the appropriate matches according to the user's needs. Note that for simplicity, FIGS. 7A and 7B describe a process in which all words (or if only one word, that word) in a search term need to match the same number of consecutive target words in the target document to be considered a match, however with other processes, less than a complete match may be considered sufficient.

At step 700 of FIG. 7A, the search term (word or phrase) is received from the user (e.g., via an Edit: Find command or the like) or some other mechanism (e.g., a global find and replace tool, or a utility or the like that is searching a number of documents to find those that match). Step 702 parses the search term into individual words, e.g., as separated by white space or according to some other criteria. Note that the search mechanism/process described in FIGS. 7A and 7B works with search terms that are single words as well as phrases of more than one word.

Step 704 represents the evaluation of whether the search term includes any handwritten words, or was exactly entered in its entirety, e.g. typed in. If any part of the search term is a handwritten word, each handwritten word is recognized, at step 706, whereby one or all of the alternates (and other information) returned by the recognizer are received and maintained such that they may be used in the matching operation (test or tests) described below. Note that this is available for situations in which when a recognizer is available and when handwritten input can be entered, however as will be understood below, neither a recognizer nor the ability to enter handwritten data is required to conduct the search described herein once the ink document has been recognized and saved, for example.

Step 708 represents the selection of a target word from the text buffer 62, or from associated saved search data, described below. When the ink word document itself is open, such as when actively editing, the target word may be actual (e.g., typed-in) text, or may be an ink word that is either recognized and displayed as text or recognized and displayed as a handwritten entry. If not recognized, the alternates information may be obtained for the target word at this time (not separately shown). The process continues to FIG. 7B.

Step 720 of FIG. 7B selects the first word in the search term. Step 722 determines whether the word in the text buffer (or in the search data) is a recognized ink word (IW) or the text of an exact word. Note that any other types of special characters other than ink words (such as indicating a pointer to a graphical image) that may be in the text buffer may be handled otherwise, e.g., ignored or specially tested, however such special characters are not considered herein for purposes of simplicity.

Step 724 represents the comparison test for when the currently selected target word is text (not an ink word). For example, if both the search term and the target word (e.g., the string of text up to the next ink word) are exactly entered text, then simple string comparison may be performed to look for a match. In this manner, the user ordinarily will not receive a match for text that is not the same as the search-specified text. Alternatively, (as also represented by step 724), if the target word is not an ink word, but the search term is an ink word with alternates, the search term alternates can be used in the evaluation, in one set of tests (Test Set A), as set forth in the matrix below:

|  | Target Word = Text | Target Word = Ink |
| --- | --- | --- |
| Search Term Word = Text | String Comparison | Test Set B |
| Search Term Word = Ink | Test Set A | Test Set C |

Test Set A may be the same as the simple string comparison, e.g., by using only the text of the most-probable alternate, or may be some other test or tests using some or all of the other alternates in addition to the most-probable. One such simple test is to use each of the alternates of the search term in separate exact match tests against the target text string, and considering the word a match if any alternate matches the string. Other tests that may be performed including more "fuzzy" tests are described below and in the aforementioned U.S. patent application Ser. No. 09/643,617, such as those that use only some of the more probable alternates.

Step 726 represents the test or tests that may be performed when the target word is an ink word having alternates, and may, for example, correspond to FIG. 8. In general, if the search term word has alternates, both the alternates for the search term word and the alternates of the ink word may be used in testing (Test Set B in the above matrix), while if the search term word is exact text, then the testing process may be the same (Test Set B but with only one "alternate" for the search term word), or a different test or tests may be used (Test Set C). Further, Test Set C may have the same tests but with different (looser or more exact) matching requirements than Test Set B. Some of the various tests that can be performed using alternates are described below with reference to FIG. 8.

Following the word testing, step 728 represents the determination of whether a match was found between the search term word and the target word. If so, step 728 advances to step 730 to evaluate whether the entire search term (word or phrase) was matched to a corresponding target word or phrase (of consecutive words) in the document or search file data. In general, when evaluating a phrase, each time a word matches, the process advances to the next word in the search word stream via step 732 and to the next word in the target word stream via step 734, until either all search term words in the phrase were individually matched as determined by step 730, or a non-match is detected at step 728. It should be noted that the search may be adjusted for certain types of recognizers. For example, in some Japanese recognizers, every character is treated as a word unit, including any English-language characters that the recognizer recognizes. To handle such recognizers, the query string may be parsed differently, such as to be able to reparse the query when multiple languages are encountered in the same document. To this end, before each word is compared, a test may be performed to determine whether the word is from a different locale than the previous word. If so, a second test is performed to determine whether to re-parse the text the user is looking for.

Thus, characters can be used for work breaking, or space word breaking may be used. When using spaces, an exact string comparison may be performed on the character and each of the alternates; for words of more than one character, such words are broken up into separate words. The query text is compared to the target text in the document on a per word basis, whereby in order to produce correct matches, the query is broken up in the same way that the text is provided to the searching subsystem.

In one implementation, if a complete search term match is detected at step 730, step 740 is executed to add the match to a match list 90 (FIG. 2). In other implementations, step 740 may alternatively perform some other suitable action, such as to display the found text or ink word to the user and await user instruction, or include the searched file in a list of files that contain the search term, and then go on to search the next file. In the event that a match list 90 is first being built, which, for example, can include maintaining information identifying the positions in the text buffer of matched words, the process may continue to look for matches by returning to step 720, following a rewinding process, described below. Note that step 736 can, for example, also be modified to support a global find and replace (Replace All) or other automatic find-related operation, such as by automatically performing the replace at this time, although alternatively, any such replace operations may be performed after the set of matches has been built. Step 744 represents processing the list of matches, which may, for example, include revisiting the search hits and asking the user what to do, performing any replace operations, highlighting the matches, and so forth.

Returning to step 728, anytime that step 728 detects that no match was found, (or after detecting a complete match at step 730 and taking some action at step 740 that requires further searching), the target stream is rewound back to where it was at the start of the phrase comparison, plus one target word, so that partial phrase matches will not cause potentially matching target words to be skipped. For example, a search term such as "A A A A A A B" will at first partially match the target "A A A A A A A A A B" since both start with the same six words ("A"), but unless the target is rewound along with the search term, the later complete match (of six consecutive "A" words followed by a "B" word) will not be detected. To this end, step 738 is executed to rewind (e.g., moves a pointer to) the target word stream back to where it was at the start of the searching, whereby the next target word will be selected at step 740. Of course, this is equivalent to rewinding the pointer to one place past where it was, in a single operation. Before restarting the search however, the process may test whether the target words have been exhausted. For efficiency, instead of detecting an end of file or the like in the middle of a phrase comparison, the process may instead determine whether a complete match is even possible given the size of the search term versus the remaining words in the document. To this end, step 742 may test where there are sufficient target words remaining to be tested against the number of words in the search term. If so, step 742 branches back to step 720 to similarly rewind the search term being tested to its first word and thereafter continue the comparison from the next target word, otherwise step 742 branches to step 744 to process the match list (if any) in some way.

The above process thus locates search terms comprising a single word or multiple word phrases that are present in an ink document. It can be appreciated that other ways to extend the general search process of FIGS. 7A and 7B may be implemented. For example, as described above, the phrase searching process may be extended to locate less than exact matching phrases. Further, equivalent amounts of source and target strings may be processed to check for potential matches. By way of example, consider a user that writes "Together again" as phrase, but the phrase is incorrectly recognized as "To get her a game." Instead of parsing to compare individual words, combinations of recognized and alternate words may be concatenated (or split) to look for matches. The target stream thus will not necessarily have the same amount of words as the search stream, and the word units in the search stream and/or the target stream can be concatenated and/or split from the characters and symbols therein in various ways to look for matches.

FIG. 8 represents how the search term alternates, if more than one, and one or more of the target alternates corresponding to an ink word can be used to perform a fuzzy (i.e., not necessarily exact match) search on an individual pair of (search term and target) word units being compared. In general, as will be understood, the set of each search term word alternates and target alternates can each be tested against one another until a match is found or no alternates remain. For efficiency, one or both of the sets may be reduced in the number of alternates therein, such as by removing the less-probable words. In one current implementation the recognizer returns ten alternates per ink word sent thereto, providing up to one hundred comparisons for a handwritten search term and an ink word. Using some of the various techniques/tests described below, some potential matches can be quickly eliminated, such as by only considering certain of the words based on the number of syllables in the search and target words under test, evaluating the words' relative lengths, by requiring that at least the first characters match, and so forth.

Step 800 of FIG. 8 represents selecting one of the search term alternates, (of which there is at least one in the present example, as a single exact search term is considered to be a single alternate). Step 802 represents getting the first target alternate. Step 804 then performs one or more tests, such as looking for an exact match between the currently selected search term alternate and the currently selected target alternate.

As generally represented at step 804, another test that can be performed (instead of an exact match test) includes determining the percentage of characters in the search term alternate that match the target alternate. The user may be allowed to set a threshold percentage, which when achieved, indicates a match. For example, the user can set a match threshold at eighty percent of character matching required, i.e., at least eighty percent of the characters in the search term alternate need to be in the target alternate. Thus, in this example, the length of the search term alternate is used as a divisor to determine the percentage, e.g., percentage equals number of matching characters divided by the length of the search term alternate. Other percentage of matching formulas may be used, e.g., the number of matching characters divided by the length of the target word alternate, or divided by the length of the longer of the two, the average of the two lengths, and so on. Another mechanism may use a fixed number of characters instead of percentages, e.g. instead of setting a threshold that at least eighty percent of characters need to match, the threshold may be set such that at most three characters may be different between the search and target terms. Moreover, although not necessary, by not re-testing a matched letter, multiple appearances of the same letter in a word (the "ee" in "reel") can be treated as distinct letters. For example, "reel" and "real" can be considered as matching three of four individually, not four of four, as the first "e" in "real" matches only the first occurrence of an "e" in "reel," not both.

By way of an example, consider a user entering the word "write" and instructing the search mechanism 78 to search for (e.g., Find) matching words, with a seventy percent match level based on the length of the longest of either the source's or target's current alternate word. If the target word has the word "written" as one of its alternates, a match would be found, as there are five letters (w-r-i-t-e) common to both, and five divided by seven (the length of the longer, target word) exceeds seventy percent. However, if "writing" (instead of written) was the closest (in terms of percentage of characters matched) target alternate, then only four of seven (w-r-i-t) would match, and the seventy percent threshold would not be achieved. Note that with this mechanism, not all of the characters in the target word need to match the search term alternate. For example, in the present invention, not all of the characters of the target alternate (or even the search term alternate/alternate) need be used, and the same number is not a requirement (e.g., a search term alternate of n characters can be compared to up to n+1 characters in the target alternate). Thus, in the above example, "writ" as a search term alternate (or source alternate) will match "writing" as a target alternate, but not vice-versa.

Returning to FIG. 8, step 806 evaluates whether the test (whichever test or combinations of tests is used) indicates a match between the currently selected search term and target alternates. If so, the process ends, returning information indicating a successful match (e.g., to step 728 of FIG. 7). Otherwise, step 806 branches to step 810 where another target alternate, if any, is selected at step 812. Steps 810 and 812 thus walk through the list of target alternates for each search term, (although as can be readily appreciated, it is essentially equivalent to walk through the list of search term alternates for each selected target alternate).

When each of the target alternates have been evaluated, but still no match found at step 806, steps 814 and 816 are executed to select the next search term alternate, if any, to test against each of the target alternates as described above. If no more search term alternates are available, i.e., each search term alternate was evaluated against each target alternate but no match was achieved, step 814 branches to step 818 where a failure is returned (e.g., to step 728 of FIG. 7) for this word. As described above, the next word in the document, if any, is tested in the same manner.

A number of ways to make the testing process more efficient and/or more optimal for a given user or scenario are described below. For example, regardless of the comparison scheme or schemes used, not all of the characters in the alternates being compared need be treated the same, but instead certain characters may be weighted differently. For example, in the above percentage of matching characters, if the first character matches, an extra percentage amount can be added to the actual percentage determined, thereby considering some words that would otherwise fall short as matching because their first characters were the same. As can be readily appreciated, this weighting can be performed many other ways. For example, for a six-character word, a match of the first character can be considered worth fifty percent, with ten percent for each other character. Words of other lengths can have other weighted formulas, although in general, because the recognizer has a tendency to get the first character correct, the first character may be generally assigned more weight.

In addition to the above tests, the lengths (number of characters) of the words may factor into the formula or formulas used, e.g., a search term alternate needs to be less than the length of the target alternate plus three, else the word will not be considered a match. Other criteria can be used in the evaluation. For example, the number of syllables of the words (which a recognizer can return) can be used to determine a match, e.g., it can be a requirement that the search term alternate and target alternate have to be within one syllable of one another, such as before even attempting the percentage test, (or as a separate test). For example, with such a "within n-syllable" (or syllables) test, if n is set as less than or equal to one, a search term alternate such as "probable" (three syllables) would be further compared against "probably" (three syllables), but would not be tested against the alternate word "probability" (five syllables). Again, the search term alternates may have different syllable-based rules than the target alternates, e.g., "rob" as a search term alternate may be compared with "probable," "probably" and "probability," but if "rob" was the target, it would be skipped over. Note that as used herein, the search term alternate or alternate need not be an actual word, but can be a fragment of a word or even a single character (including numbers or other symbols), e.g., "prob" can be searched.

Still other tests can be performed instead of or in addition to the above-described tests. For example, the first (most-probable) search term alternate may have to exactly match one of the alternates in the set corresponding to the target ink word, otherwise the words can be considered as not matching. Conversely, if the source has alternates, the first target alternate may have to exactly match one of the source alternates. A still "looser" exact match test would be the above-described exact match of any of the source alternates with any of the target alternates. Note that FIG. 8 inherently handles the preciseness of a "typed-in" search term alternate, as such a word would have only one "source alternate," i.e., the word itself, however as also described above, the test or tests of step 804 can be changed when typed-in search terms are in use.

Moreover, because words returned by a recognizer may be ranked according to a probability, and/or because the probability information may be maintained with the word as described in the aforementioned U.S. patent application entitled "Method and System for Maintaining Alternates in Association with Recognized Words," the alternates can be weighted differently. For example, as listed alternates become less probable, the exactness of the match (e.g., percentage of matching characters) that is considered necessary to have a match may be varied, e.g., increased. A Bayesian (e.g., double the probability, double the weight) or other statistical method may be used.

Still other tests may be used instead of, or to supplement, the above-described tests. For example, instead of requiring that any one search term alternate match any one target alternate, a percentage (or other count) of alternate to alternate matches may be required. In such an instance, step 806 of FIG. 8 is not considered satisfied unless and until this percentage or count is achieved. For example, if ten search term alternates are compared against ten target alternates and forty percent is the matching threshold, step 806 looks for (e.g., by counting for) forty matches out of the one-hundred possible combinations. Note that each alternate-to-alternate match can be determined by any of the above-described tests, e.g., exact or percentage of characters-based, possibly with differently characters weighted and so forth, and including factors such as relative length, number of syllables and/or probability information.

Also, for ink words, image matching can be used to supplement the above-described testing operation. For example, the ink data (such as stored as coordinates, as a bitmap, as features or the like) can be used to help determine whether a given search term (itself handwritten or typed-in and matched to ink of some other target word) matches a target ink word. In other words, what would otherwise be a match according to the above-described alternate matching test or tests may be eliminated (before or after the alternate testing) if the search and target words' ink data are sufficiently different, while what would otherwise not be a match may be considered a match if the ink words' data are sufficiently similar. Image matching that can supplement the use of alternates in searching for matching ink words is described in U.S. Pat. No. 5,687,254, hereby incorporated by reference.

It should be pointed out that the above-described tests are only some of the ways in which alternates information for handwritten ink data may be used in searching. As can be appreciated, other tests and/or techniques may be substituted or used to supplement the described techniques without departing from the spirit and scope of the present invention.

Other benefits result from the fuzzy search of the present invention. For example, when searching, users want diacritically equivalent words to be found, regardless of how those words have been entered or recognized. Conventional text-based search algorithms perform significant extra processing such as string normalization in order to match varying-length diacriticals. However, the fuzzy matching processes of the present invention can automatically overcome this problem, because they are able to match strings of varying lengths, and/or those having some other differences between the source and target strings.

As generally described above, fuzzy searching of words and phrases can occur on an actively open document, e.g., one that is being edited by a user, with recognition taking place as needed. The searching of the present invention can also be implemented on search file data that is incorporated into, attached to, or otherwise associated with a saved ink document. If physically separate from the ink document, the search file data may be saved in a file or equivalent data structure, such as a portion of a database. In general, the search file data preserves the results of the recognition operations that occurred when the ink document was open and last saved. As a result, rapid searching, such as for locating documents having common search terms therein, can be accomplished without requiring any recognition.

Figure 9:
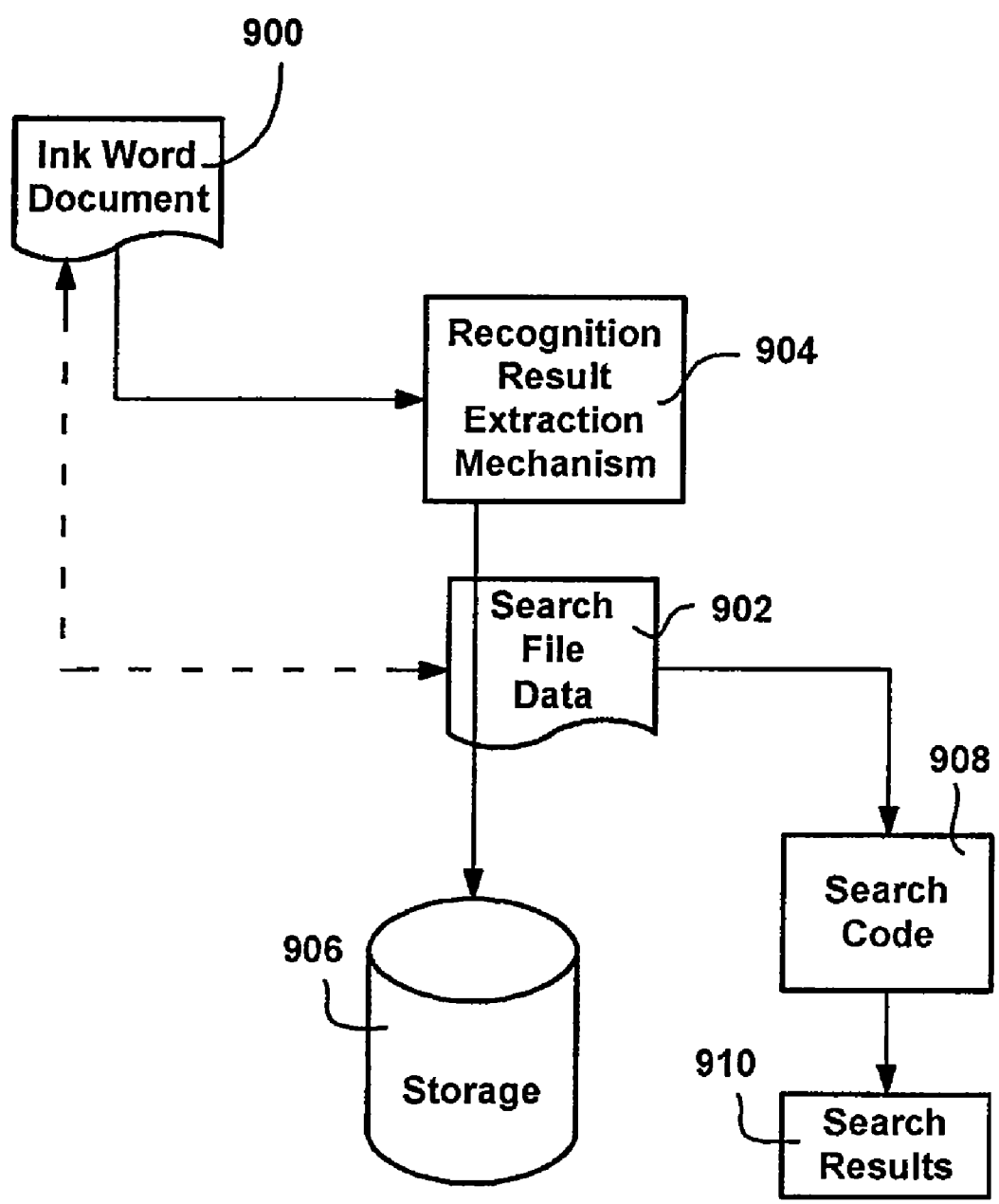
FIG. 9 is a block diagram representing components configured to save search file data in association with an ink document, in accordance with one aspect of the present invention.

To accomplish the above-described fuzzy or other searching with a saved ink word document 900, as generally represented in FIG. 9, the necessary handwriting recognition data is extracted from the ink recognition components each time the ink document is saved, and preserved as search file data 902, by an appropriate extraction mechanism 904, e.g., a component within the ink processor 54 of FIG. 2. Note that some or all of this extraction may also occur on each change to the document, or at some defined interval, e.g., the search file data or part thereof may be built and modified as the user edits the ink document, and then (if necessary) the changes committed when saved. When extracted, the search file data 902 is preferably persisted to non-volatile storage 906 in some association with the ink document, either as part of the same file, or as with some linking data to the ink document 900 so that the appropriate ink document can be located from the search file data 902.

The search file data 902 is maintained separately from the actual ink data, or at least in some manner where its data may be easily filtered from it. This enables search code 908 and/or other code to use the results of the handwriting recognition to provide search results 910, without having to invoke handwriting recognition every time the data is needed. Thus, although referred to as search file data herein, it is understood that it is actually the recognition results that are being saved, at least in part, which may be searched, but also may be used for other purposes unrelated to searching.

For searching, the data of interest generally includes recognized text, alternates, probability (confidence) values, and any other data that may be available from the recognition sub-system (such as the number of syllables) may be stored in a tagged format, using a tagging scheme such as an XML or a similar XML-like schema, that maintains the integrity of the original information and/or allows relevant portions of this information, including, but not limited to, the original data structures, to be fully or partially recreated without invoking the handwriting recognition subsystem. For example, the data is maintained such that a set of alternates may be related to the primary recognition candidate, and so on. In addition, the recognition data is saved in a plain-text form (e.g., ASCII, Unicode, or UTF-8) that allows text-based, non-ink-aware search programs to do some level of basic text and pattern matching on the contents of a text-based search file. Other formats for storing the recognition data are feasible. For example, although tags may add convenience, it is not necessary to the present invention to store this information in a tagged format, but instead the data may easily be stored in a non-tagged format (e.g., comma separated strings, using tabs or spaces as separators, or using some non-tagged but structured format). Such formats explicitly or implicitly contain enough relational information to preserve the integrity of a sufficient amount of the original information to be useful.

An example of some sample data saved using one such schema is outlined in the table below:

```
<?xml version="1.0?">
<NBRecoText>
    <version>1.0</version>
    <numWords>7</numWords>
    <localeID>1033</localeID>
    <w c=HIGH s=SPACE>
        <p>quotes</p>
        <a>dotes quotas Cotes Quotes Azotes grates quote quoter quoted</a>
    </w>
    <w c=MED s=NEWLINE>
        <p>score</p>
        <a>swore Score Swore store snore Store shore Snore Shore</a>
    </w>
    <w c=MED s=NEWLINE>
        <p>and</p>
        <a>ant ante And ands art awed aunt arid ants</a>
    </w>
    <w c=MED s=NEWLINE>
```

-continued

```
        <p>10</p>
        <a>Lo to lo 60 so 00 Io Wo no</a>
    </w>
    <w c=HIGH s=NEWLINE>
        <p>years</p>
        <a>yeans year pears yeas yeast yean gears pear fears</a>
    </w>
    <w c=HIGH s=NEWLINE>
        <p>ago</p>
        <a>ago! age agt. agog ago: Ago agro ages Argo</a>
    </w>
</NBRecoText>
```

Figure 10:
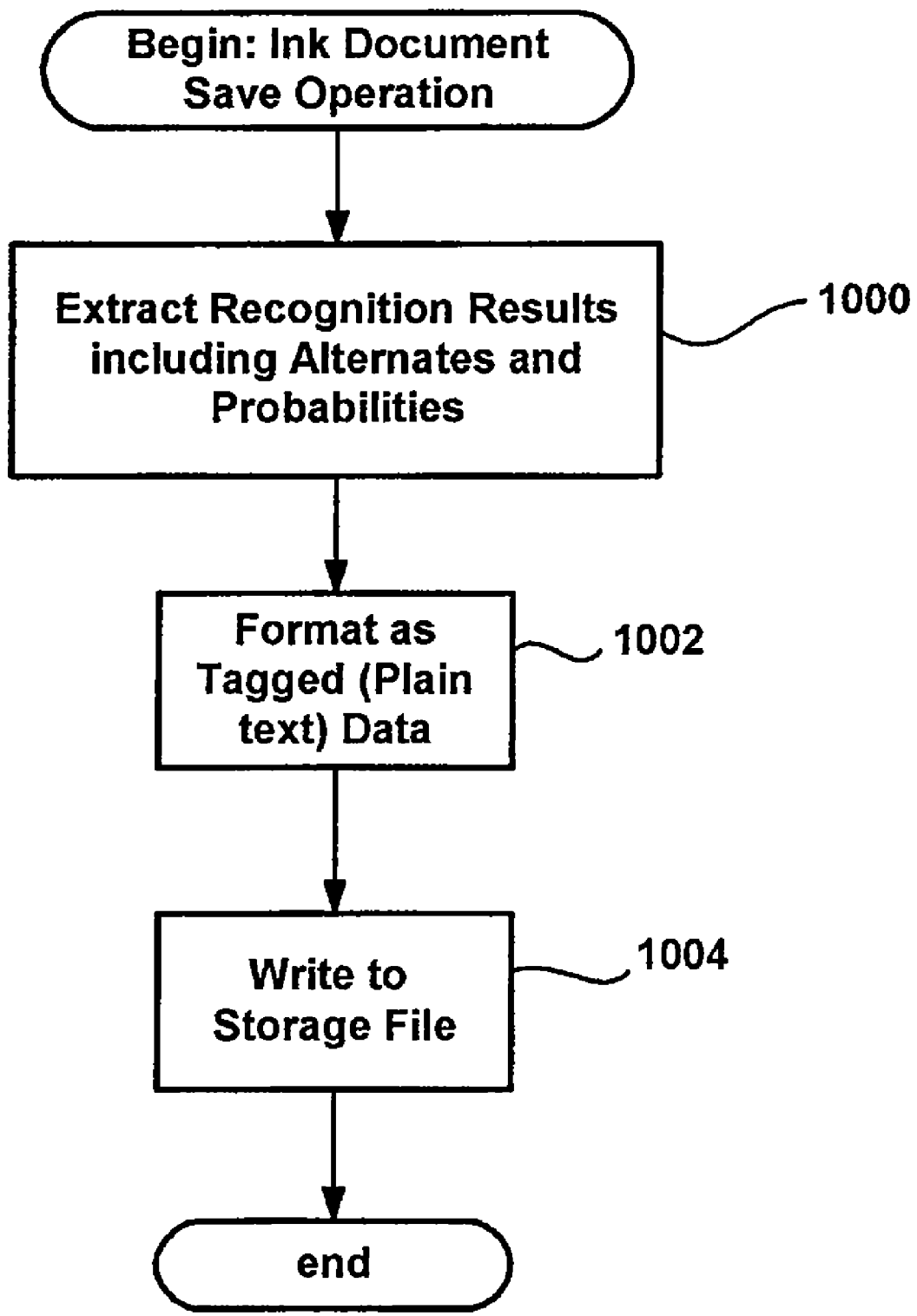
FIG. 10 is a flow diagram generally describing the saving of search file data in association with an ink document in accordance with one aspect of the present invention.

FIG. 10 shows the general operation of the extraction mechanism, including step 1000 which represents the extraction of the recognition results, including the alternates for recognized ink words and their corresponding probabilities. Step 1002 represents the formatting of the recognition results as the search file data, and step 1004 the saving of the data to the storage.

For the purposes of fuzzy searching the search file data for matching words and phrases, the general process of FIGS. 7A and 7B as described above can be employed as the search code 908, although as is understood, the search terms that are input may be limited to being typed text, depending on the system in which the search is being conducted. Also, when operating with a search file, the target stream is derived from the saved file independent of the inking components.

As can be seen from the foregoing detailed description, there is provided a method and system that enables ink words and phrases and other words to be searched in a document and in a saved file. The method and system are flexible and may be varied and/or otherwise customized to meet a variety of scenarios.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   a. receiving a search term comprising a plurality of word units;
   b. conducting a search for an instance of the search term in a set of target data to be searched beginning at a target stream, the search including:
      i. selecting a first word unit in the search term as a selected search word unit, and selecting a corresponding word unit in the target stream as a selected target word unit;
      ii. comparing the selected search word unit with the selected target word unit and providing a match result indicative of whether a sufficient matching level is achieved, wherein when the selected target word unit is recognized handwritten word having alternates, comparing includes evaluating the alternates; and
      iii. determining based on the match result whether the search term sufficiently matches the target stream, and
         1. if so, considering the search a success with respect to the target stream and advancing to step (C), and
         2. if not, determining whether additional word units in the search stream need to be compared to determine whether the search term sufficiently matches the target stream, and
            a. if so, selecting a next word unit in the search term as the selected search word unit, and selecting a next corresponding word unit in the target stream as the selected target word unit and returning to step (B) (ii); and
            b. if not, considering the search a failure with respect to the target stream and advancing to step (C);
   and
   (C) returning information indicative of the success or failure of the search and concluding the search with respect to the target stream.

2. The method of claim 1 wherein a sufficient match is achieved at step (B) (iii) when each match result indicated that each word unit in the search term matched each corresponding word unit in the target stream.

3. The method of claim 1 wherein a sufficient match is achieved at step (B) (iii) when a threshold percentage of matches are present between the word units in the search term and the word units in the target stream.

4. The method of claim 1 further comprising, parsing the search term into the word units.

5. The method of claim 1 wherein receiving the search term includes receiving data recognized from handwritten ink data.

6. The method of claim 1 further comprising, selecting a new target stream, and re-running steps (B) and (C) using the search term and the new target stream.

7. The method of claim 6 wherein selecting a new target stream comprises advancing to the next word beyond the start of the target stream that was previously searched.

8. The method of claim 1 further comprising, obtaining the target data from saved search file data.

9. The method of claim 1 wherein a corresponding word unit in the target stream has alternates, and wherein evaluating the alternates includes determining a percentage of characters that match between the search word unit and at least one of the alternates.

10. The method of claim 1 wherein a corresponding word unit in the target stream has alternates, and wherein evaluating the alternates includes determining whether the search word unit exactly matches one of the alternates of the target word unit.

11. The method of claim 1 wherein the search word unit has recognized alternates and its corresponding target word unit has alternates, and wherein evaluating the alternates includes determining a percentage of exact matches between the alternates of the search word unit and the alternates of the target word unit.

12. The method of claim 1 wherein a corresponding word unit in the target stream has alternates, and wherein evaluating the alternates includes using probability information accompanying the alternates.

13. The method of claim 1 wherein a corresponding word unit in the target stream has alternates, and wherein comparing the search word unit with the target word unit having alternates includes evaluating the lengths of at least some of the alternates.

14. The method of claim 1 wherein a corresponding word unit in the target stream has alternates, and wherein comparing the search word unit with the target word unit having alternates includes evaluating the number of syllables of at least some of the alternates.

15. The method of claim 1 wherein information indicative of a successful search is returned, and further comprising adding information corresponding to the successful search to a match list.

16. A computer-readable storage medium having stored computer-executable instructions for performing the method of claim 1.

17. A computing device comprising a processor and memory having, stored thereon, computer-executable instructions for performing the method of claim 1.

18. A computer-implemented method, comprising:

retrieving saved file data as target data, the target data including data corresponding to at least one ink word that has been recognized from handwritten input as a set of alternates, the target data including at least some of the alternates of the set;

receiving a search term representing data to find; and searching for an instance of the search term in the target data, including comparing the search term with the at least some of the alternates in the target data to determine if a sufficient matching level is achieved to consider the search term as present in the target data, and if so, returning information indicative of a successful match.

19. A computer-readable storage medium having stored computer-executable instructions for performing the method of claim 18.

20. A computing device comprising a processor and memory having, stored thereon, computer-executable instructions for performing the method of claim 18.

* * * * *